United States Patent
Bentley et al.

(10) Patent No.: US 8,305,904 B1
(45) Date of Patent: Nov. 6, 2012

(54) METHOD AND SYSTEM FOR VERIFYING REPAIRS IN A TELECOMMUNICATION NETWORK

(75) Inventors: Dennis L. Bentley, Ellenwood, GA (US); Wayne Alexander Thompson, Stone Mountain, GA (US); Brian Kirk Lair, Independence, MO (US); Derek Whitney Hardnett, Norcross, GA (US); Gary Lee Lang, Marietta, GA (US); Richard Charles Ahlstrom, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1224 days.

(21) Appl. No.: 12/113,569

(22) Filed: May 1, 2008

(51) Int. Cl.
*G01R 31/08* (2006.01)
(52) U.S. Cl. .................................................. 370/241
(58) Field of Classification Search ............... 370/241
See application file for complete search history.

(56) References Cited

U.S. PATENT DOCUMENTS

| | | | |
|---|---|---|---|
| 7,120,686 B2 * | 10/2006 | Sasabe et al. | 709/224 |
| 2001/0056554 A1 * | 12/2001 | Chrabaszcz | 714/13 |
| 2002/0024964 A1 * | 2/2002 | Baum et al. | 370/419 |
| 2004/0010627 A1 * | 1/2004 | Ellis et al. | 709/250 |
| 2005/0172160 A1 * | 8/2005 | Taylor et al. | 714/4 |
| 2006/0168065 A1 * | 7/2006 | Martin | 709/206 |
| 2008/0016402 A1 * | 1/2008 | Harel et al. | 714/43 |
| 2008/0222730 A1 * | 9/2008 | Ford et al. | 726/25 |

* cited by examiner

*Primary Examiner* — Jason Mattis
*Assistant Examiner* — Stephen J Clawson

(57) ABSTRACT

A method is provided for verifying repairs in a communication system. In an embodiment, a service network receives a notification from an access network for a completed repair at the access network. The service network comprises a service node and the service network exchanges information with the service node through the access network. The service network retrieves a set of attributes from the notification and determines an identity of the service node using the set of attributes. A repair verification test is executed for the completed repair where the repair verification test is based upon the service node. Further, an outcome is determined for the completed repair based upon the repair verification test.

24 Claims, 6 Drawing Sheets

METHOD AND SYSTEM FOR VERIFYING REPAIRS IN A TELECOMMUNICATION NETWORK

TECHNICAL BACKGROUND

Communication providers utilize numerous network elements to provide communication services to their customers. For example, a wireless communication provider or service provider requires switches, base stations and cell towers to provide wireless or cellular services. At times, the communication provider or operator may require the use of another operator to provide communication connectivity between a switch and a base station. These operators, sometimes referred to as access network providers or edge network providers, supply the wireless operator with the necessary connectivity.

Additionally, communication providers may provide wireline communication services to their users and may require the use of an access provider to provide connectivity between its network elements. For example, a communication provider may offer frame relay (FR), asynchronous transfer mode (ATM) internet protocol (IP), Ethernet (EN) and private line (PL) data services to numerous remote customer locations. An access provider may be necessary to provide the communication link between the communication provider's core frame relay circuits and the remote customer premise equipment.

Communication service disruptions degrade the customer experience and require prompt attention by the service operators. When the disruption is due to a fault in the access provider's network, the service operator seeks to have the fault resolved in an efficient and timely manner. Because the service operator and access provider are typically operated by different entities, the service operator may not have visibility into the access provider's network. As such, when the service provider receives notice that a repair has been are made by the access provider, the service operator may wish to verify that connectivity has been restored between its network elements.

OVERVIEW

Generally described, a method is provided for verifying repairs in a communication system. In an embodiment, a service network receives a notification from an access network for a completed repair at the access network. The service network comprises a service node and the service network exchanges information with the service node through the access network. The service network retrieves a set of attributes from the notification and determines an identity of the service node using the set of attributes. A repair verification test is executed for the completed repair where the repair verification test is based upon the identity of the service node. Further, an outcome is determined for the completed repair based upon the repair verification test.

In another embodiment, a service network receives a notification from an access network for a completed repair at the access network. The service network comprises a wireless service node and the service network exchanges information with the wireless service node through the access network. The service network retrieves a first set of attributes from the notification and determines an identity of the wireless service node using the first set of attributes. A second set of attributes is retrieved and the identity of a vendor associated with the wireless service node is determined using the second set of attributes. A repair verification test is executed for the completed repair where the repair verification test is based upon the identity of the vendor associated with the wireless service node. Further, an outcome is determined for the completed repair based upon the repair verification test.

In yet another embodiment, a service network receives a notification from an access network for a completed repair at the access network. The service network comprises a wireline service node and the service network exchanges information with the wireline service node through the access network. A set of attributes is retrieved from the notification and an identity of the wireline service node is determined using the first set of attributes. A repair verification test is executed for the completed repair where the repair verification test is based upon the identity of the wireline service node. Further, an outcome is determined for the completed repair based upon the repair verification test.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Many times communication providers utilize access network providers to provide communication connectivity between the communication provider's network elements. As faults occur in the communication link between a communication provider's network elements, the communication provider may require the access provider to investigate and remedy the fault should it occur within the access provider's network. Because the communication provider may not have control or visibility into the access provider's network, different methods may be needed to ensure communication paths are available between the communication provider's network elements. One solution is to have methods and systems to verify that the repairs are completed in the access provider's network. By verifying repairs, communication providers and operators can effectively avoid many of the negative impacts on the network from failures at the access provider's network.

Figure 1:
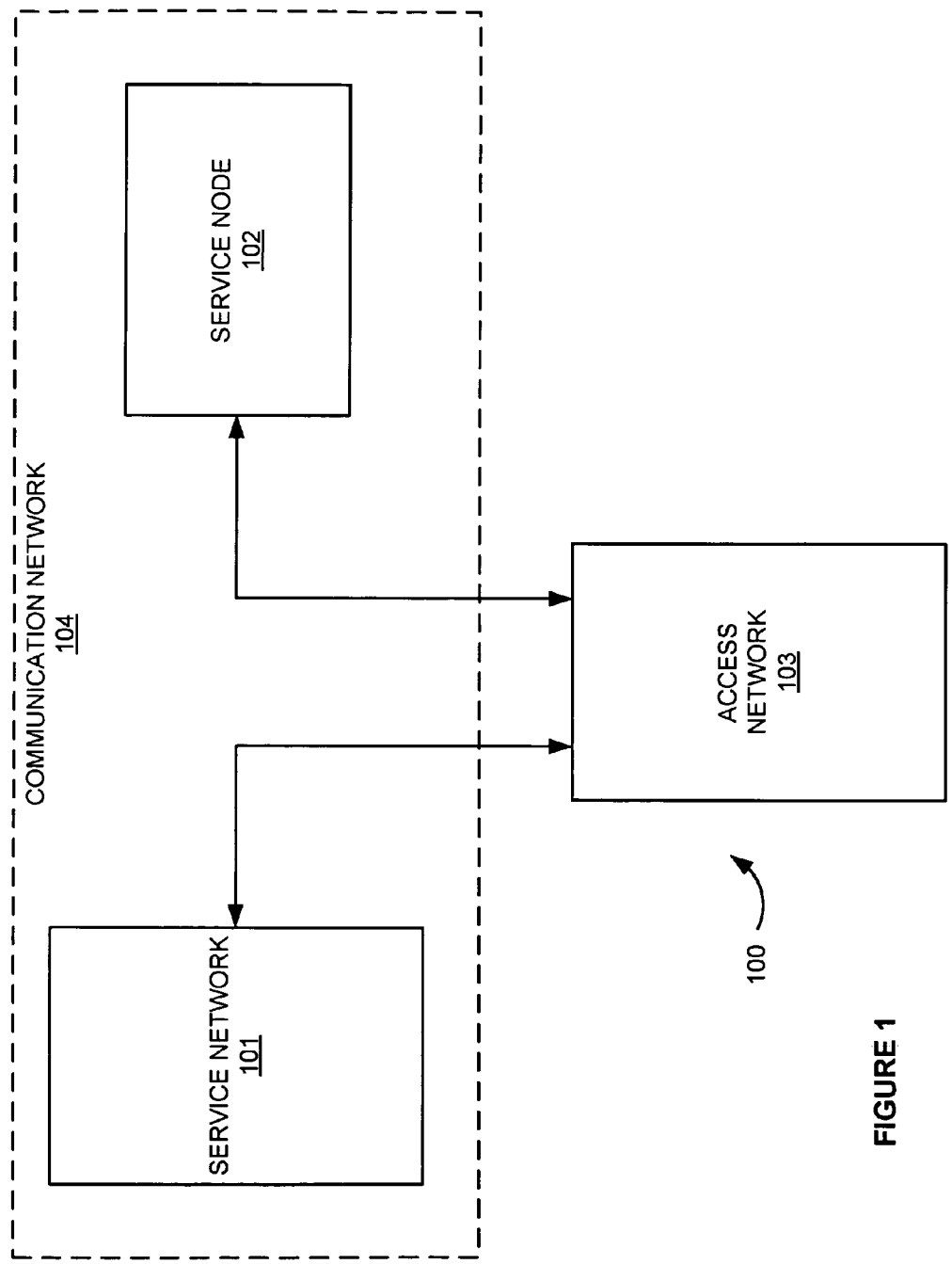
FIG. 1 is a block diagram illustrating an embodiment of a communication system for a service network to verify repairs at an access network.

FIG. 1 is a block diagram illustrating an exemplary embodiment for a service provider to verify completed repairs at an access provider in a communication system. FIG. 1 comprises service network 101, service node 102, access network 103 and communication network 104. Service network 101 and service node 102 are within a single communication network 104. Service network 101 exchanges information with service node 102 via access network 103. Service network 101 also exchanges information with access network 103 and access network 103 exchanges information with service node 102.

Service network 101 together with service node 102 form the communication network 104 that is typically operated by a single entity. Communication network 104 may comprise the necessary communication network elements to provide wireless and wireline services. These services may include voice and data services to individual subscribers or to corporate entities. Examples of wireless services may comprise voice calling, data sessions, video streaming, text messages sharing and any other communication capability that may be available to wireless device. Examples of wireline services may include switched-voice calling, packet voice calling, internet protocol network (IP), Frame Relay (FR), private line (PL), asynchronous transfer mode (ATM), Ethernet (EN) and others.

In an example, for a service provider to offer wireless communication services, the service provider has network elements to facilitate providing the wireless services. Examples of wireless equipment may comprise various elements, including base transceiver stations (BTSs), base station controllers (BSCs), mobile switching centers (MSCs), access service networks (ASNs), ASN gateways (ASN-GWs) and other elements that are known to those skilled in the art. These network elements may be part of service network 101, service node 102 or may be disbursed in a combination of both in communication network 104.

In another example, a service provider may offer wireline services and may use network elements to facilitate this offering. Examples of wireline network elements may comprise routers, circuit switches, packet switches, ATM network switches, FR switches, transport network devices and the like. Further, service provider network equipment may include customer premise equipment, servers, computing platforms and the like to enable use of the wireline services described above. As with wireless service elements, the wireline network elements may be part of service network 101, service node 102 or distributed in a combination of both in communication network 104.

Many times service providers use another telecommunication provider or access provider to enable access to other portions of the service provider's network. Access providers make available access network 103 that would comprise local communication links or the "last mile" to provide communication connectivity to the service provider customer location or other service provider network assets such as wireless network elements. Access network 103 may be referred to as a local exchange, local exchange carrier, local central office, local office, switching center, switching exchange, telephone exchange and the like. Access network 103 would include many of the same elements in communication network 104 including routers, circuit switches, packet switches, T1 circuits and any other communication and computing equipment to provide communication connectivity between communication network elements.

In some cases, a service provider may need to utilize an access provider to provide communication connectivity between the service provider's network elements. For example, for the service provider to communicate between its MSC and BSCs or BTS to MSC, the service provider may not have connectivity utilizing its own assets. In such a case, the service provider would utilize an access provider to provide the connectivity between the MSC and BSC.

Communication network 104 includes any type of network that offers communications capabilities between users. Communication network 103 could be any packet-based network or packet switching system where packets are routed over data links shared with other traffic. Characteristics of packet-based networks include optimizing channel capacity available in a network, minimizing transmission latency and increasing robustness of communication. For example, communication network 104 could include many of the public switched data networks such as the internet protocol network (IP), frame relay (FR), asynchronous transfer mode (ATM), private line (PL), General Packet Radio Service (GPRS), Ethernet (EN) and others. Communication network 104 could also include any number of private data networks that would utilize similar protocols.

Communication network 104 could also comprise any circuit-based communications network including the public switched telephone network (PSTN). Circuit-switching networks may be characterized as communication networks that establish dedicated circuits or channels between nodes and terminals to enable users to communicate with one another.

Communication network 104 may also comprise management network elements in service network 101 to facilitate the managing and controlling of communication network 104. Managing communication network 104 comprises billing, authenticating and other network management functions to facilitate monitoring the communication network. Examples of network management functions comprise controlling, planning, allocating, deploying, coordinating, and monitoring the resources of a network, including performing functions such as initial network planning, frequency allocation, predetermined traffic routing to support load balancing, cryptographic key distribution authorization, configuration management, fault management, security management, performance management, bandwidth management, and accounting management. Elements that may perform management functions comprise authentication servers, provisioning servers, security servers, billing platforms and any other platform that enables a network provider to manage its network.

When a service provider utilizes another party's access network, the service provider lacks visibility into the access provider network. For example, the operator of communication network 104 may require the use of access network 103 to have connectivity to service node 102. Should a disruption in communication occur between service network 101 and service node 102, one possible cause is a fault in access network 103. If this is the case, the operator would need to engage the access provider to determine the cause of the fault and remedy the fault as necessary.

Figure 2:
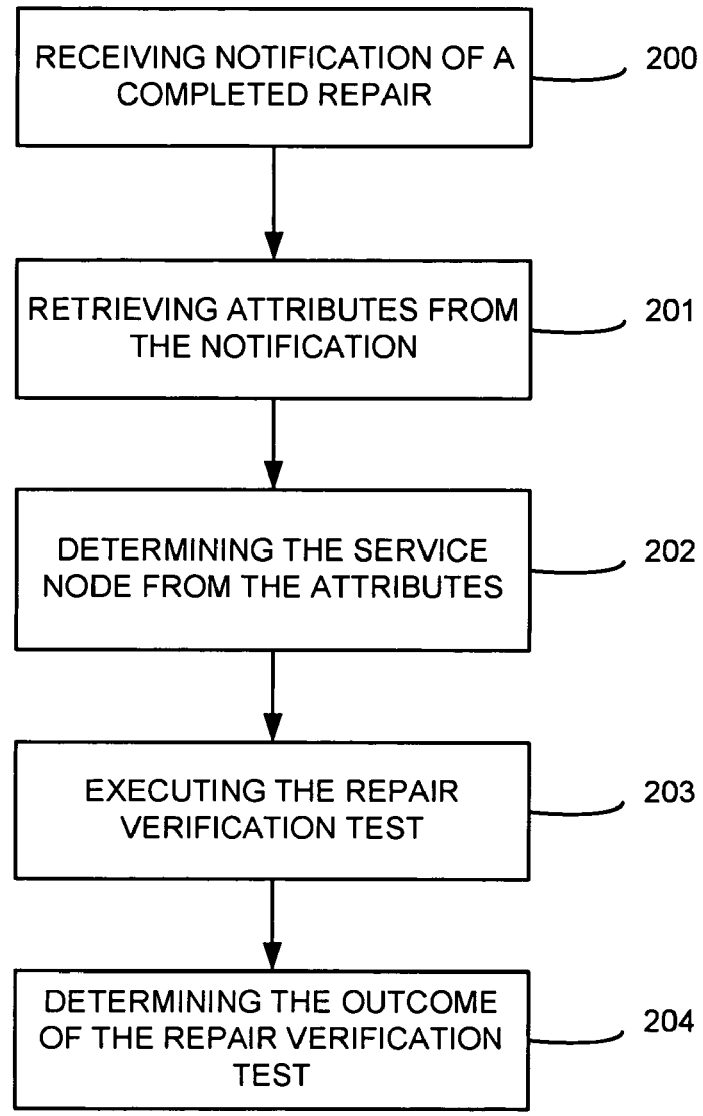
FIG. 2 is a flow diagram illustrating a method for verifying repairs in an access network at a communication network.

In operation, referring now to FIG. 2, a method is provided for verifying repairs in a communication system. While the exemplary method discussed in FIG. 2 is shown as operating on the communication system of FIG. 1, other systems and configurations may also be utilized to execute the method of FIG. 2.

A notification is received at service network 101 from access network 103 that a repair has been completed at access network (200). The notification indicates that access network 103 has completed a repair that would now enable service network 101 to communicate with service node 102 via access network 103. The notification may be made utilizing any number of communication protocols including any standardized or proprietary protocol. Examples of communication protocols may include telecommunication network (TELNET), session initiated protocol (SIP), short message service (SMS), tXML, CMIP, TCPIP and any other protocol that would enable notifications to be sent between network elements and communication networks.

Service network 101 retrieves a set of attributes from the notification (201). The attributes comprise all data that would identify the repairs that were completed, any previous test results, the network elements affected by the repair and any other information that would aid service network 101 to resume communication with service node 102. Examples of the attributes may include the identity of service node 102 as a wireless or wireline network element.

Service network 101 determines the identity of service node 102 using the attributes (202). As stated above, the service node 102 may be a wireless or wireline network element. For example, attributes for wireless and wireline network elements may include the circuit, circuit type, ports and any other data associated with the network element.

Service network 101 executes a repair verification test for the completed repair (203). The type of repair verification test that is executed is dependent upon the type of service node 102 that is to be accessed. For example, when verifying a completed repair for a FR circuit, the repair verification test would include a logical test to validate that traffic is flowing between service network 101 and service node 102. Should the logical test fail for the FR circuit, then a physical layer test would then be performed as part of the repair verification test. In another example, for a private line circuit, the repair verification test may only include a physical layer test.

The type of repair verification test may also vary depending upon the vendor supplying service node 102. For example, service node 102 may be a wireless network element such as a BTS. The vendor of the BTS may have unique and proprietary interfaces and protocols to the BTS that would require a unique verification test to execute the repair verification.

Service network 101 determines the outcome for the repair verification test (204). Depending on the type of repair verification test, service network 101 processes the results of the repair verification test to determine if the anticipated result of the repair verification test matches the actual result of the repair verification test. Service network 101 can then clear the fault when such a match occurs.

Figure 3:
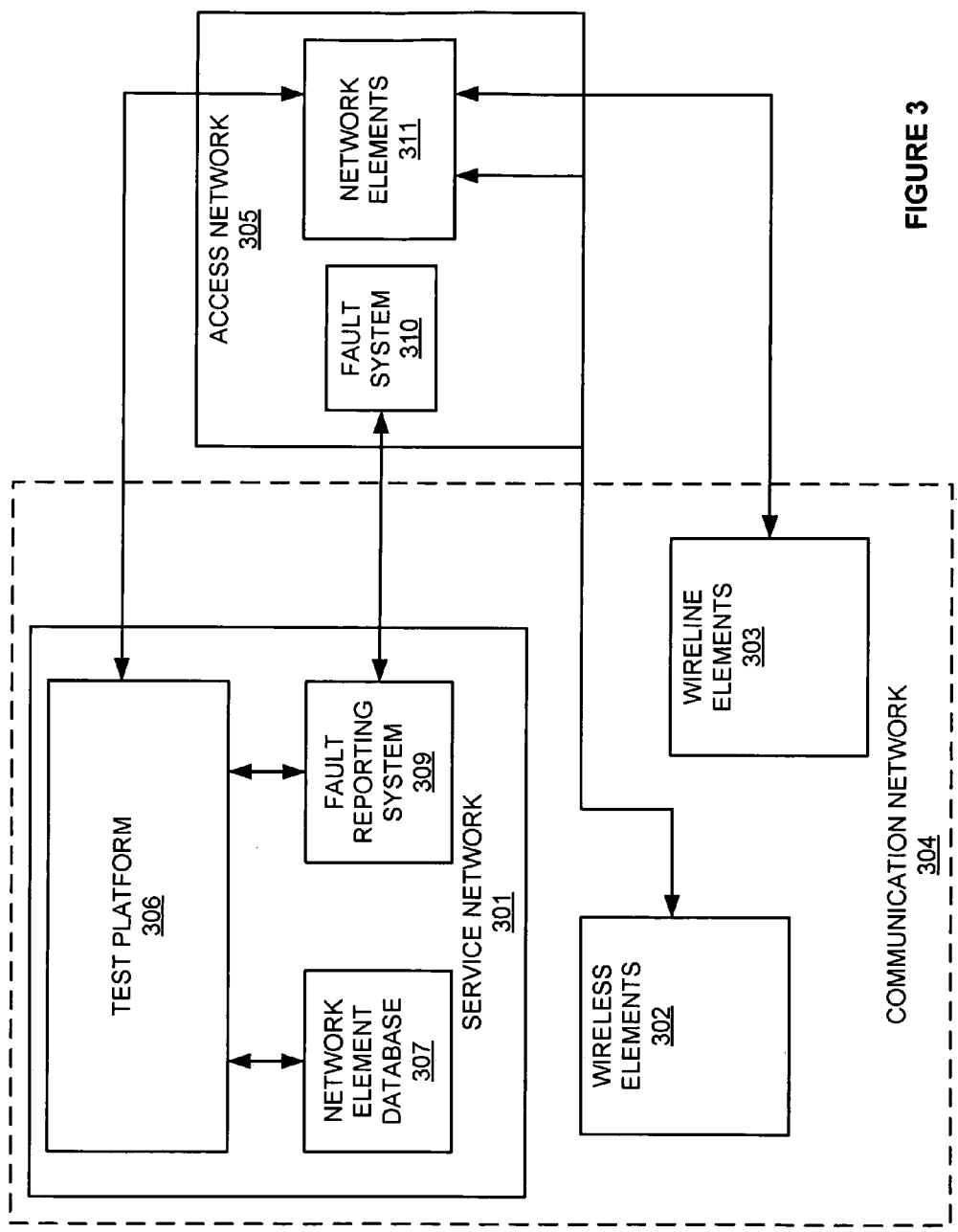
FIG. 3 is a block diagram illustrating an embodiment of a communication system for a communication network to verify repairs at an access network.

FIG. 3 is a block diagram illustrating another embodiment for a service provider to verify completed repairs at an access provider in a communication system. FIG. 3 comprises service network 301, wireless elements 302, wireline elements 303, communication network 304, access network 305, test platform 306, network element database 307, fault reporting system 309, fault system 310 and network elements 311. Communication network 304 comprises service network 301, wireless elements 302 and wireline elements 303. Service network 301 comprises test platform 306, network element database 307 and fault reporting system 309. Access network 305 comprises fault system 310 and network elements 311.

Test platform 306 exchanges information with network element database 307 and fault reporting system 309. Test platform also exchanges information with wireless elements 302 and wireline elements 303 via network elements 311. Fault reporting system 309 exchanges information with fault system 310.

Service network 301 together with wireless elements 302 and customer elements 303 form the communication network 304 that is typically operated by a single entity. Communication network 304 may comprise the necessary communication network elements to provide wireless and wireline services. These services may include voice and data services to individual subscribers or to corporate entities. Examples of wireless services may comprise voice calling, data sessions, video streaming, text messages sharing and any other communication capability that may be available to wireless device. Examples of wireline services may include switched-voice calling, packet voice calling, internet protocol network (IP), frame relay (FR), private line (PL), asynchronous transfer mode (ATM), Ethernet (EN) and others.

In one embodiment, for a service provider to offer wireless communication services, the service provider has network elements in service network 301 and wireless elements 302 to facilitate providing the wireless services. Examples of wireless elements 302 may comprise various elements, including base transceiver stations (BTSs), base station controllers (BSCs), mobile switching centers (MSCs), access service networks (ASNs), ASN gateways (ASN-GWs) and other elements that are known to those skilled in the art. Further, wireless elements 302 may be supplied by a variety of different vendors or suppliers.

In another example, a service provider may offer wireline services and may use network elements in service network 301 and wireline elements 303 to facilitate this offering. Examples of wireline network elements may comprise routers, circuit switches, packet switches, ATM network switches, FR switches, private line circuits and the like. Further, service provider network equipment may include customer premise equipment, servers, computing platforms and the like to enable use of the wireline services described above.

Service providers use other telecommunication providers or access providers to enable access to other portions of the service providers' network. Access providers make available access network 305 that would comprise local communication links or the "last mile" to provide communication connectivity to the service provider customer location or other service provider network assets such as wireless network elements. Access network 305 may be referred to as a local exchange, local exchange carrier, local central office, local office, switching center, switching exchange, telephone exchange and the like. Network elements 311 in access network 305 would include many of the same elements in communication network 304. Network elements 311 may include routers, circuit switches, packet switches, T1 circuits and any other communication and computing equipment to provide communication connectivity between service network 301 and wireless elements 302 and wireline elements 303.

A service provider may need to utilize an access provider to provide communication connectivity between the service provider's network elements. For example, referring to FIG. 3, service network 301 may include a MSC (not shown) and wireless elements 302 may include one or more BSCs (not shown). For the service provider to communicate between its MSC and the BSCs, the service provider may not have connectivity utilizing its own assets. In such a case, the service provider would utilize access network 305 and its network elements 311 to provide the connectivity between the MSC and BSCs.

Test platform 306 provides the management and provision of testing capabilities for communication network 304. Test platform 306 would include the necessary elements to enable a service provider to initiate testing of its circuits and network elements and manage the testing processes throughout its network.

Test platform 306 also performs the function of providing testing routines and commands to wireless elements 302 and wireline elements 303. Test platform 306 may perform physical and logical tests for the circuits and elements in wireless elements 302 and wireline elements 303.

Fault reporting system 309 communicates with fault system 310 in access network 305. Fault reporting system also exchanges information with test platform 306. Fault reporting system 309 may comprise any platform that has the capability to send and receive network status notifications for both communication network 304 and access network 305. Notifications may include trouble tickets and any other fault reporting ticket.

Network element database 307 comprises one or more databases that store information about communication network's 304 network elements. Test platform 306 utilizes network element database 307 for identifying and managing the service provider's communication network 304.

In operation, when a disruption in service occurs between service network 301 and wireless elements 302 or wireline elements 303, service network 301 determines the cause of the failure. If the failure is due to a fault at access network 305, access network 305 is notified of the failure. When access network 305 resolves the fault, access network 305 notifies service network 301 of the completed repair.

Figure 4:
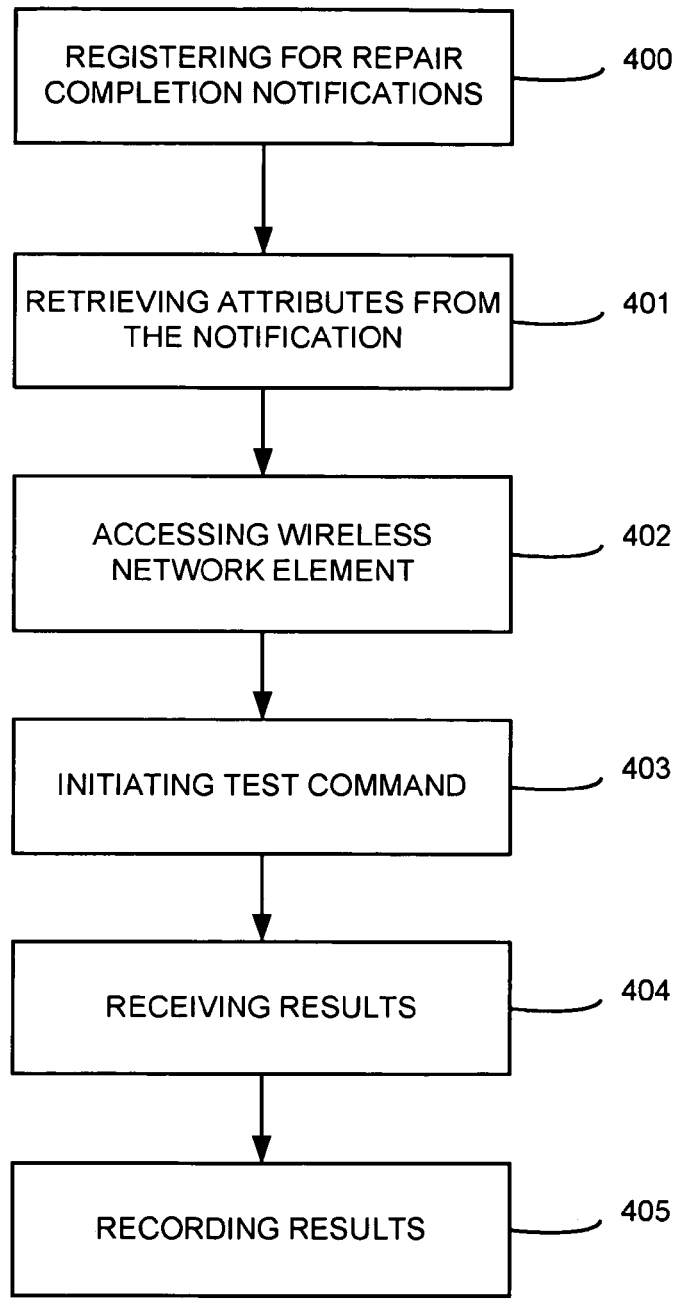
FIG. 4 is a flow diagram illustrating a method for verifying repairs in an access network when the disruption of service is between a service network and a wireless element.

Referring now to FIG. 4, a flow diagram is provided that illustrates an exemplary method for verifying a repair at access network 305 when the disruption of service is between service network 301 and wireless elements 302. Test platform 306 registers with fault reporting system 309 to receive notifications of a completed repair at access network 305 (400).

Upon receiving a notification that a fault has been repaired for a disruption between service network 301 and wireless elements 302, test platform 306 retrieves repair verification test attributes from network element database 307 utilizing the network element name and BTS identification (401). Repair verification test attributes may comprise the name of the vendor, the vendor element management system internet protocol (IP) address, the BTS T1 IP address, and the cell site identification number.

As described above, a variety of vendors may supply a service provider with wireless elements 302. Test platform 306 utilizes the repair verification test based upon the proprietary interface for the particular vendor wireless network element. For example, vendor A may utilize a proprietary format and syntax when accessing vendor A's wireless elements 302.

Utilizing the test attributes, test platform 306 begins executing a repair verification test sequence. A repair verification sequence comprises accessing the wireless network element (402), initiated a test command to the wireless network element (403) and receiving a result from the wireless network element (404). The repair verification sequence of steps 403 and 404 are repeated a predetermined number of times. When the result is an anticipated result and the anticipated result is returned the predetermined number of times, the repair verification test is noted as "PASSED". If the anticipated result is not returned for any one of the predetermined number of times, the repair verification test is noted as "FAILED" and the test sequence steps 403 and 404 are run again after a certain amount of time has elapsed. The repair verification sequence is executed until the sequence has been noted as "PASSED" or after the sequence has run a predetermined number of times.

In an embodiment, the repair verification sequence steps 403 and 404 are repeated 10 times. When the result is an anticipated result and the anticipated result is returned 10 times, the repair verification test is noted as "PASSED". If the anticipated result is not returned for any one of the 10 times, the repair verification test is noted as "FAILED" and the test sequence steps 403 and 404 are run again after 10 minutes. The repair verification sequence is executed until the sequence has been noted as "PASSED" or after the entire sequence has run a total of 3 times.

In another embodiment, test platform 306 may send a predetermined number of packets when verifying a repair for a data-only network element in steps 403 and 404. In such a case, the repair verification test may be declared as "FAILED" when any one of the predetermined packets is lost during the transmission. Further, the repair verification sequence may be executed until the sequence has been noted as "PASSED" or after the entire sequence has run a predetermined number of times.

Upon completion of the repair verification sequence, test platform 306 records the results (405). The test results report or log may comprise the wireless network element vendor name, wireless network element identification, wireless network element IP address, BTS identification, BTS T1 IP address, cell identification, cell subcomponent, number of test sequence iterations and test result.

Accessing the wireless network element at step 402 may be further broken down into other process steps. For example, a user id and password may be necessary to access the network element's management system. The element's management system may vary depending on the vendor of the network element. Further, varying command lines and directories may need to be initiated and accessed depending on the network element that is accessed such as a data only network element or a voice circuit.

Initiating the test command at step 403 may also be dependant upon identity of the wireless network element. One element may require the identity of the BTS to initiate the command while others may require the identity of the cell sector. And other network elements may require the identity of the BTS T1 IP address for initiating the test command. Test commands may comprise any functional computer command that initiates a logical test on the wireless network element. Examples of command protocols that may be used include "ping" commands, "op" commands, "action" commands and any other protocols that could be used by those skilled in the art. Further, test commands may vary depending on if the network element is a data-only network element or a voice circuit network element.

Additionally, receiving the results of the repair verification test at step 404 may also be dependant upon the wireless network element that is accessed. For example, an anticipated result for a "ping IP address" command may be the returning of "IP address is alive".

Figure 5:
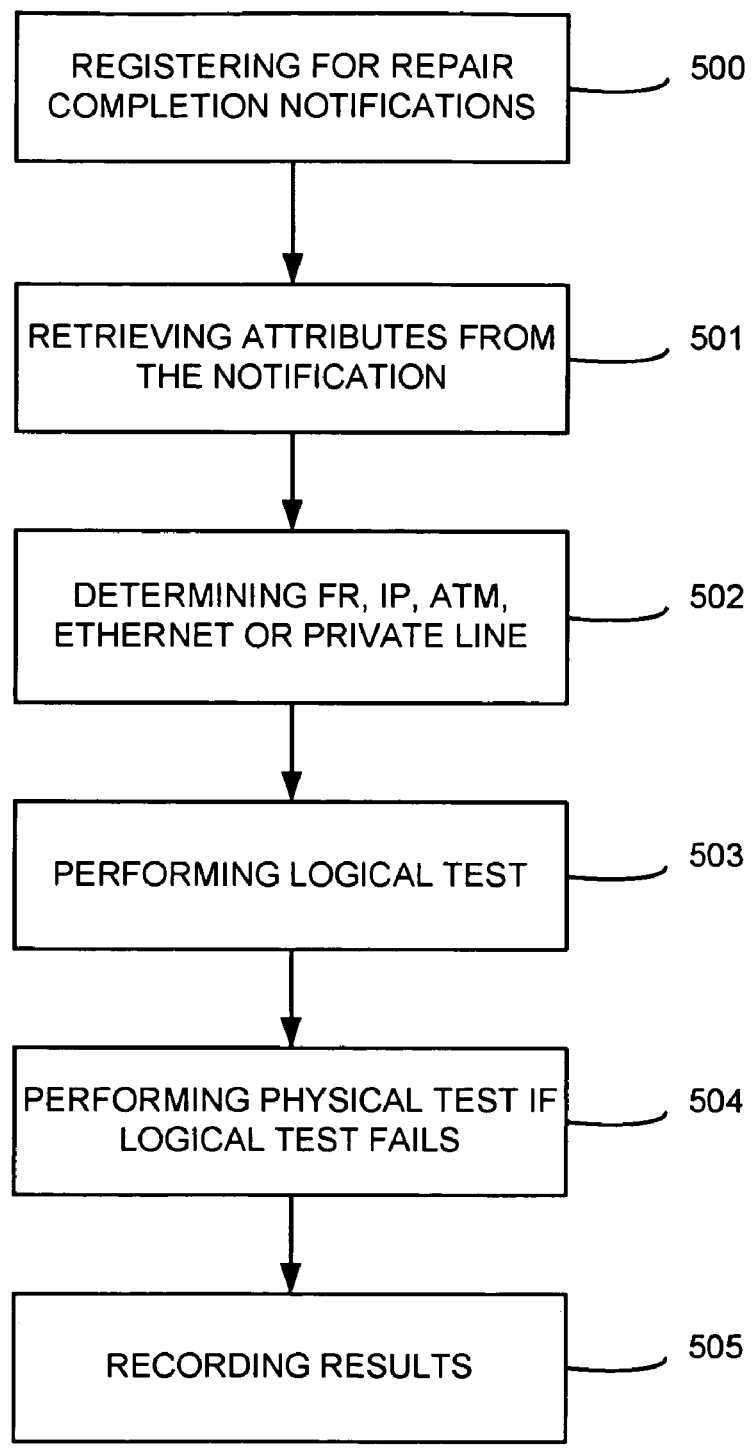
FIG. 5 is a flow diagram illustrating a method for verifying repairs in an access network when the disruption of service is between a service network and a wireline element.

Referring now to FIG. 5, a flow diagram is provided that illustrates an exemplary method for verifying a repair at access network 305 when the disruption of service is between service network 301 and wireline elements 303. Test platform 306 registers with fault reporting system 309 to receive notifications of a completed repair at access network 305 (500).

Upon receiving a notification that a fault has been repaired for a disruption between service network 301 and wireline elements 303, test platform 306 retrieves repair verification test attributes from network element database 307 utilizing the network element name (501). Repair verification test attributes may comprise the wireline network element circuit identifier, wireline network element circuit type, wireline network element private line number, and previous test results. The previous test results may include the point of failure test name, circuit, private line, FR test flag, FR test results, IP test flag, IP test results and parent tested flag.

Test platform 306 determines if the fault is related to a FR, IP, ATM, Ethernet or Private Line circuit utilizing the attributes above (502). If the circuit is a FR, ATM or IP circuit, then test platform 306 performs a logical test (503). A logical test for a FR circuit may be a link management indicator test or the like. A logical test for an IP circuit may comprise a router status message or the like. Other logical tests may apply as well as would be known to those skilled in the art.

If the FR or IP logical tests fail or if the circuit is a private line circuit, test platform 306 performs a physical test (504). Physical tests may comprise any bit-error rate testing utilizing protocols known to those skilled in the art. Protocols may be standardized or proprietary testing protocols.

Upon completion of the repair verification testing, test platform 306 records the results for the verification test (505). The test results report or log may comprise the FR or IP logical test results, the private line physical test results, and the physical test results for the failed FR or IP logical test results.

Figure 6:
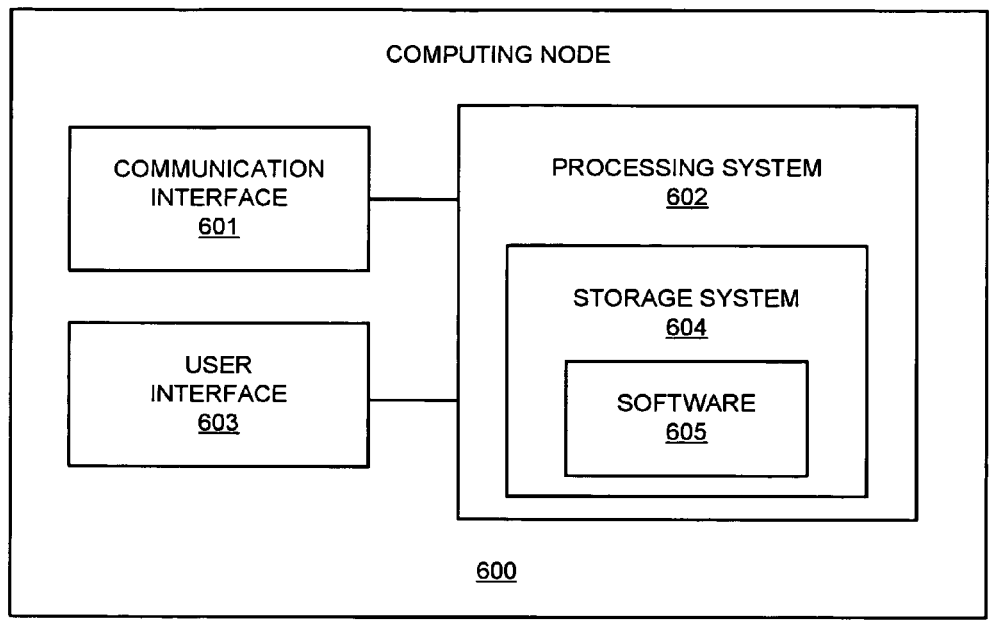
FIG. 6 is a block diagram illustrating a computing system.

FIG. 6 is a block diagram illustrating a computing system that may be utilized by the network elements described in FIGS. 1 and 3 and for the methods described herein. Computing node 600 includes communication interface 601, processing system 602, and user interface 603. Processing system 602 includes storage system 604. Storage system 604 stores software 605. Processing system 602 is linked to communication interface 601 and user interface 603. Computing node 600 could be comprised of a programmed general-purpose computer, although those skilled in the art will appreciate that programmable or special purpose circuitry and equipment may be used. Computing node 600 may be distributed among multiple devices that together comprise elements 600-605.

Communication interface 601 could comprise a network interface, modem, port, transceiver, or some other communication device. Communication interface 601 may be distributed among multiple communication devices. Processing system 602 could comprise a computer microprocessor, logic circuit, or some other processing device. Processing system 602 may be distributed among multiple processing devices. User interface 603 could comprise a keyboard, mouse, voice recognition interface, microphone and speakers, graphical display, touch screen, or some other type of user device. User interface 603 may be distributed among multiple user devices. Storage system 604 could comprise a disk, tape, integrated circuit, server, or some other memory device. Storage system 604 may be distributed among multiple memory devices.

Processing system 602 retrieves and executes software 605 from storage system 604. Software 605 may comprise an operating system, utilities, drivers, networking software, and other software typically loaded onto a computer system. Software 605 could comprise an application program, firmware, or some other form of machine-readable processing instructions. When executed by processing system 602, software 605 directs processing system 602 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for verifying repairs in a communication system, the method comprising:
    receiving a notification from an access network at a service network for a completed repair at the access network, wherein the service network and a service node are within a communication network operated by a wireless communication service provider that does not include the access network, and wherein the service network exchanges information with the service node through the access network;
    retrieving a first set of attributes from the notification;
    when the first set of attributes identifies the notification as a wireless notification, retrieving a second set of attributes and determining an identity of a vendor associated with the service node using the second set of attributes;
    executing a repair verification test for the completed repair wherein the repair verification test is based upon the identity of the vendor associated with the service node; and
    determining an outcome for the completed repair based upon the repair verification test.

2. The method of claim 1 wherein the access network is a local exchange carrier.

3. The method of claim 1 wherein executing the repair verification test further comprises:
    accessing the service node; and
    executing a test command.

4. The method of claim 1 wherein receiving the notification from the access network comprises receiving the notification at a fault reporting system.

5. The method of claim 1 wherein retrieving the first set of attributes, determining the identity of the vendor, and determining the outcome for the repair verification test are performed by a test platform.

6. The method of claim 1 wherein retrieving the second set of attributes comprises retrieving the second set of attributes from a network element database.

7. The method of claim 1 wherein executing the repair verification test comprises executing a logical test.

8. The method of claim 1 further comprising executing the repair verification test a predetermined number of times.

9. The method of claim 1 wherein the repair verification test comprises a logical test and a physical test when the first set of attribute identifies the notification as a wireline notification.

10. The method of claim 9 further comprising performing the physical test when the logical test fails.

11. The method of claim 1 wherein determining the outcome further comprises:
    accepting the completed repair when the repair verification test returns an anticipated result; and
    denying the completed repair when the repair verification test does not return the anticipated result.

12. The method of claim 11 further comprising notifying the access network of the outcome.

13. A method for verifying repairs in a communication system, the method comprising:
    receiving a notification from an access network at a service network for a completed repair at the access network, wherein the service network and a wireless service node are within a communication network operated by a wireless communication service provider that does not include the access network, and wherein the service network exchanges information with the wireless service node through the access network;

retrieving a first set of attributes from the notification;

determining an identity of the wireless service node using the first set of attributes;

retrieving a second set of attributes;

determining an identity of a vendor associated with the wireless service node using the second set of attributes;

executing a repair verification test for the completed repair wherein the repair verification test is based upon the identity of the vendor associated with the wireless service node; and determining an outcome for the completed repair based upon the repair verification test.

14. The method of claim 13 wherein executing the repair verification test further comprises:

accessing the wireless service node; and executing a test command.

15. The method of claim 13 further comprising executing the repair verification test a predetermined number of times.

16. The method of claim 15 further comprising reporting the repair verification test as failed when the outcome fails to meet an anticipated result in any one of the predetermined number of times.

17. The method of claim 16 further comprising executing the repair verification test after a predetermined amount of time when the repair verification test failed.

18. The method of claim 13 wherein the repair verification test comprises a logical test.

19. A method for verifying repairs in a communication system, the method comprising:

receiving a notification from an access network at a service network for a completed repair at the access network, wherein the service network and a wireline service node are within a communication network operated by a wireless communication service provider that does not include the access network, and wherein the service network exchanges information with the wireline service node through the access network;

retrieving a set of attributes from the notification;

determining an identity of the wireline service node using the first set of attributes;

retrieving a second set of attributes;

determining an identity of a vendor associated with the wireline service node using the second set of attributes;

executing a repair verification test for the completed repair wherein the repair verification test is based upon the identity of the vendor associated with the wireline service node; and determining an outcome for the completed repair based upon the repair verification test.

20. The method of claim 19 further comprising performing a logical repair verification test when the identity of the wireline service node is a frame relay element.

21. The method of claim 20 further comprising performing a physical repair verification test when the logical repair verification test fails.

22. The method of claim 19 further comprising performing a logical repair verification test when the identity of the wireline service node is an internet protocol element.

23. The method of claim 22 further comprising performing a physical repair verification test when the logical repair verification test fails.

24. The method of claim 19 further comprising performing a physical repair verification test when the identity of the wireline service node is a private line element.

* * * * *